(12) United States Patent
Smiljanovski et al.

(10) Patent No.: US 11,047,348 B2
(45) Date of Patent: Jun. 29, 2021

(54) METHODS AND SYSTEMS FOR EXHAUST-GAS RECIRCULATION

(71) Applicant: Ford Global Technologies, LLC, Dearborn, MI (US)

(72) Inventors: Vanco Smiljanovski, Bedburg (DE); Joerg Kemmerling, Monschau (DE); Helmut Matthias Kindl, Aachen (DE); Andreas Kuske, Geulle (NL); Hanno Friederichs, Aachen (DE); Franz Arnd Sommerhoff, Aachen (DE); Frank Kraemer, Neunkirchen-Seelscheid (DE); Frank Wunderlich, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/434,083

(22) Filed: Jun. 6, 2019

(65) Prior Publication Data

US 2019/0376476 A1  Dec. 12, 2019

(30) Foreign Application Priority Data

Jun. 7, 2018 (DE) .......................... 102018208983.3

(51) Int. Cl.
*F02M 26/06* (2016.01)
*F02M 26/50* (2016.01)
*F02D 41/00* (2006.01)
*F02M 26/19* (2016.01)

(52) U.S. Cl.
CPC ........... *F02M 26/06* (2016.02); *F02D 41/005* (2013.01); *F02M 26/19* (2016.02); *F02M 26/50* (2016.02); *F02D 2200/0414* (2013.01); *F02D 2200/0418* (2013.01)

(58) Field of Classification Search
CPC ........ F02M 26/06; F02M 26/13; F02M 26/17; F02M 26/19; F02M 26/20; F02M 26/50; F02D 41/0047; F02D 41/005; F02D 41/0065; F02D 2041/0067; F02D 2041/007; F02D 41/0077; F02D 41/0007; F02D 2200/0414; F02D 2200/0418; F02B 37/16; F02B 47/08
See application file for complete search history.

(56) References Cited

U.S. PATENT DOCUMENTS

| | | | |
|---|---|---|---|
| 6,886,544 B1 * | 5/2005 | Bui | F02M 35/10118 123/568.17 |
| 6,945,238 B2 | 9/2005 | Huebler | |
| 7,121,268 B2 | 10/2006 | Andoh et al. | |
| 7,607,301 B2 | 10/2009 | Harada et al. | |
| 8,261,725 B2 | 9/2012 | Furukawa et al. | |

(Continued)

FOREIGN PATENT DOCUMENTS

DE  102009034653 A1  1/2011

*Primary Examiner* — Jesse S Bogue
*Assistant Examiner* — Loren C Edwards
(74) *Attorney, Agent, or Firm* — Geoffrey Brumbaugh; McCoy Russell LLP

(57) ABSTRACT

Methods and systems are provided for an exhaust-gas arrangement. In one example, a system may include a barrier dividing an intake passage into first and second portions to mitigate exhaust-gas recirculate mixing with charge air upstream of a compressor.

6 Claims, 4 Drawing Sheets

(56) References Cited

U.S. PATENT DOCUMENTS

| | | | |
|---|---|---|---|
| 2011/0225955 A1* | 9/2011 | Kimura | F02M 26/06 |
| | | | 60/278 |
| 2012/0222642 A1* | 9/2012 | Elsasser | B01F 5/064 |
| | | | 123/184.21 |
| 2014/0366533 A1 | 12/2014 | Shioda | |
| 2017/0138319 A1* | 5/2017 | Zurlo | F02M 26/19 |
| 2017/0145967 A1 | 5/2017 | Penzato | |

* cited by examiner

METHODS AND SYSTEMS FOR EXHAUST-GAS RECIRCULATION

CROSS REFERENCE TO RELATED APPLICATION

The present application claims priority to German patent application No. 102018208983.3, filed on Jun. 7, 2018. The entire contents of the above-listed application are hereby incorporated by reference for all purposes.

FIELD

The present description relates generally to mixing recirculated exhaust gas and air.

BACKGROUND/SUMMARY

An exhaust gas recirculation (EGR) system may be used to reduce the emission of oxides of nitrogen, which arise during the combustion of fuel in an internal combustion engine. Exhaust gas may be mixed with the charging air and recirculated through the internal combustion engine. By the admixture of exhaust gas into the induced air the oxygen content thereof reduces, and with a fuel injection the combustion temperature of the fuel-air mixture reduces. Because the reaction speed of the formation of nitrogen oxide depends on the combustion temperature, less nitrogen oxide forms at low combustion temperatures.

With a low pressure (LP) EGR system, exhaust gas is taken from the exhaust tract downstream of an exhaust aftertreatment system and is fed into the charge air upstream of the compressor of a turbocharger. Compared to a high pressure (HP) EGR system, the recirculated exhaust gas in a LP EGR system is cooler and contains fewer particles. It may be a disadvantage of a LP EGR system that water contained in the exhaust gas is precipitated as condensate on falling below the dew point of the exhaust gas. In this case, condensate may form both in the gas flow if warm exhaust gas encounters cold air, and on dividing walls of the exhaust tract or the EGR system if the dividing walls cause the dew point of the exhaust gas to be undershot. It may be undesired that drops of relatively large sizes can agglomerate in the condensate. Drops above a threshold size can cause degradation if they pass into the compressor and contact a compressor wheel.

A strategy for counteracting the formation of a condensate is to bring together recirculated exhaust gas and induction air only immediately before a compressor. The disadvantage of said strategy is that at high exhaust gas temperatures and large amounts of recirculated exhaust gas the material of the compressor is loaded by the high temperatures and could be damaged.

In one example, the issues described above may be addressed a system for an intake passage comprising a barrier configured to fluidly separate a first portion from a second portion, a LP-EGR passage configured to flow EGR to only the second portion, and a flap arranged in the second portion upstream of an outlet of the LP-EGR. In this way, the flap may adjust charge air flow through the second portion and thereby a mixing amount between LP-EGR and charge air upstream of the compressor.

As one example, a position of the flap may be based on one or more of an engine load and a LP-EGR temperature. If the engine load is greater than a threshold, then more charge air may be desired and it may be undesired to impede charge air flow through the first and second portions due to the flap not being fully opened or due to LP-EGR flow. If the LP-EGR temperature is less than or close to a dew point temperature such that mixing charge air with the LP-EGR results in condensate formation, then the flap may be closed so that the mixing amount is reduced to a relatively low value. In this way, the LP-EGR and charge may minimally mix directly upstream of the compressor, wherein condensate formation as a result of this mixing may result in smaller droplets unable to degrade compressor components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
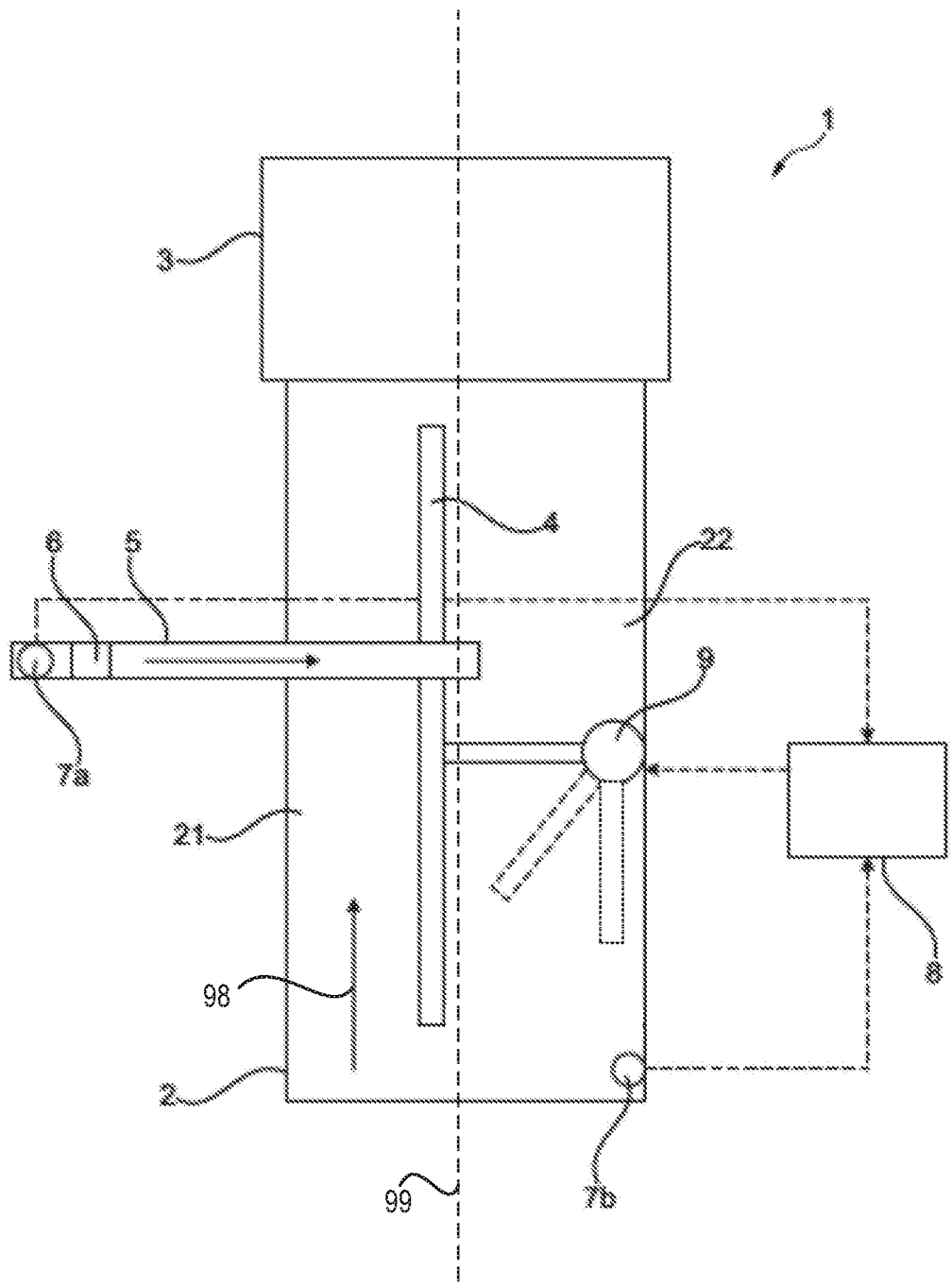
FIG. 1 shows a schematic representation of an embodiment of an LP-EGR arrangement.
Figure 2:
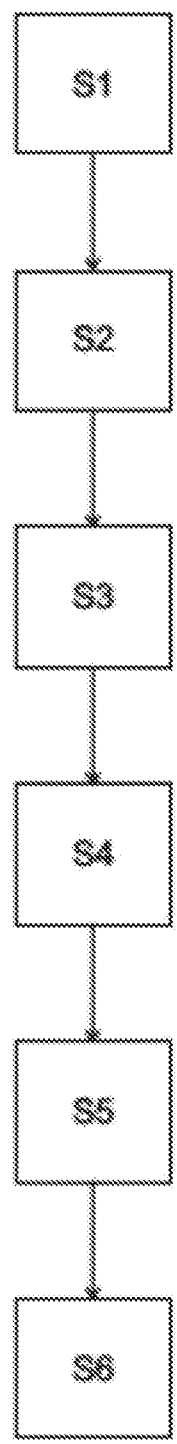
FIG. 2 shows a method for operating one or more valves of the LP-EGR arrangement.

The following description relates to systems and methods for a low-pressure exhaust gas recirculation (LP-EGR) arrangement. The LP-EGR arrangement is schematically illustrated in FIG. 1. Therein, an intake passage is divided into two portions, included a first portion and a second portion. The first portion may freely receive charge air whereas the second portion may be fitted with a valve configured to adjust charge air flow thereto. During some operating parameters, a position of the valve may be adjusted to limit mixing of the charge air and LP-EGR upstream of a compressor. A method for adjusting the valve and an EGR valve are shown in the methods of FIGS. 2 and 4. An engine of a hybrid vehicle which may be configured to utilize the LP-EGR arrangement of the present disclosure is illustrated in FIG. 3.

Figure 3:
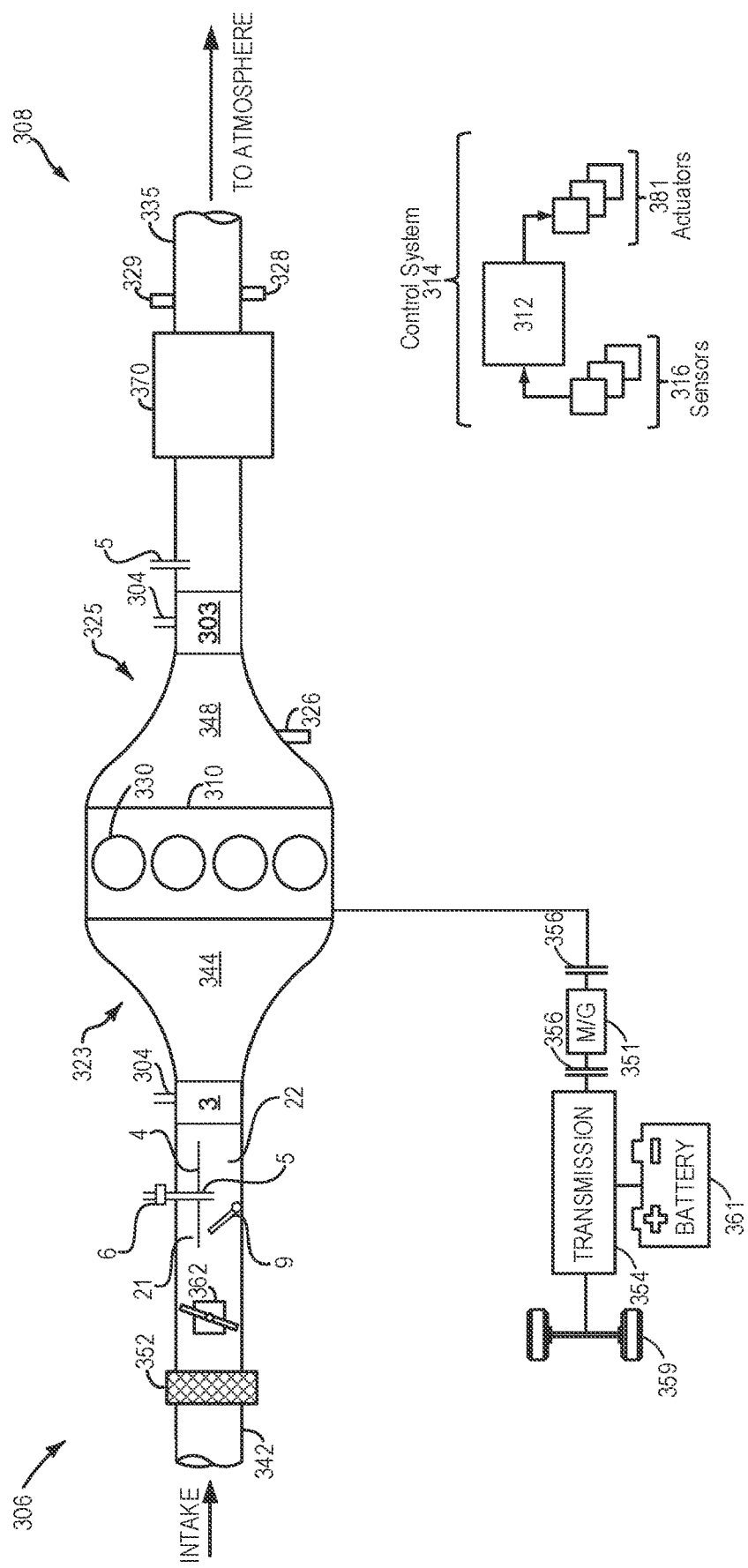
FIG. 3 shows a schematic of a hybrid vehicle comprising a turbocharged engine which may comprise the LP-EGR arrangement.
Figure 4:
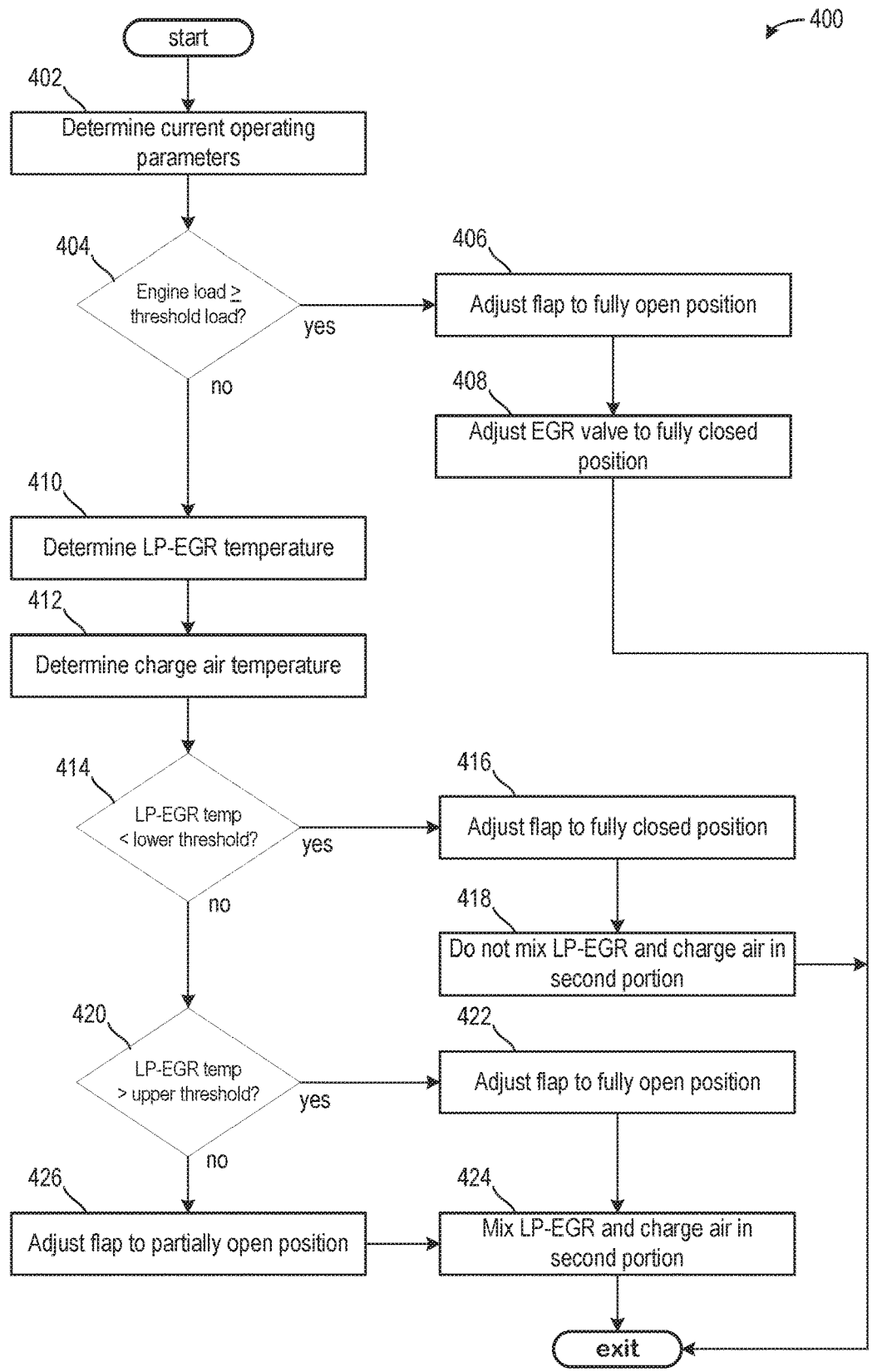
FIG. 4 shows a method for operating a flap and an EGR valve.

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, an arrangement 1 of an induction tract 2 is shown. The induction tract 2 passes charging air to an internal combustion engine (such as engine 312 of FIG. 3) of a motor vehicle. A compressor 3 that compresses the charging air is disposed in the flow path of the induction tract 2. Upstream of the compressor 3, a dividing wall 4 is disposed in the induction tract, which divides the induction tract 2 into an outer tube 21 and an inner tube 22 in a defined section ending immediately upstream of the compressor.

The wall of the inner tube 22 is formed by the dividing wall 4 and the wall of the induction tract 2. In a preferred embodiment, the dividing wall 4 is embodied so as to partially enclose the volume of the inner tube 22. Accordingly, the dividing wall 4 is curved in cross-section, i.e. in the direction of flow of the exhaust gas. Alternatively, the dividing wall 4 can also be straight in cross-section and can divide the exhaust system 2 simply over a defined segment. The volume of the inner tube 22 is larger than that of the outer tube 21 in the embodiment shown in FIG. 1. The volumes of the tubes 21, 22 can however also be of equal size, or the volume of the outer tube 21 can be greater than that of the inner tube 22.

An exhaust gas recirculation line 5 opens into the inner tube 22. The exhaust gas recirculation line 5 branches off from an exhaust system (e.g., exhaust system 325 of FIG. 3) in order to pass the exhaust gas from the exhaust system into the induction tract 2. A first valve 6 is disposed in the exhaust gas recirculation line 5. The first valve 6 is provided for controlling a flow of exhaust gas through the exhaust gas recirculation line 5. At least one first temperature sensor 7a that is disposed in the exhaust gas recirculation line 5 is connected to a controller 8. At least one second temperature sensor 7b that is also connected to the controller 8 is disposed in the induction tract.

A second valve 9 is disposed in the region of the inner tube 22. The second valve 9 is embodied as a flap valve 9 that adopts different degrees of opening. The second valve 9 can fully open the inner tube 22 (represented with a short dashed line), can fully close the inner tube 22 (represented with a solid line) and can adopt different degrees of opening in between (represented with a long dashed line). The second valve 9 may be actuated by a signal sent from the controller 8 to an actuator of the second valve 9. The controller 8 is connected to different sensors in the region of the arrangement 1, for example to temperature sensors. The exhaust gas recirculation line 5 opens into the inner tube 22 downstream of the second valve 9.

The outer tube 21 and the inner tube 22 are configured to open in the downstream and upstream directions. The dividing wall 4, and thereby the tubes 21, 22, end in the downstream direction spatially directly upstream of the compressor 3.

In one example, the arrangement 1 of FIG. 1 illustrates a portion of an intake passage (e.g., induction tract 2) upstream of a compressor (e.g., the compressor 3). The intake passage is configured to direct charge air toward the compressor. The intake passage may be shaped via an intake pipe, wherein a shape of the intake pipe may be cylindrical.

A LP-EGR line (e.g., exhaust gas recirculation line 5) protrudes through a wall of the intake pipe and extends into the intake passage. In one example, the LP-EGR line extends beyond a central axis 99 of the intake passage. In one example, the central axis 99 is aligned with a geometric center of the intake passage. Furthermore, a direction of intake air flow through the intake passage, indicated by arrow 98, is parallel to the central axis 99.

The intake passage may be divided into a first portion (e.g., outer tube 21) and a second portion (e.g., inner tube 22). A barrier, such as the dividing wall 4, may fluidly separate the first portion from the second portion such that gases in the first portion may not mix with gases in the second portion. In one example, a volume of the second portion may be larger than the first portion. As such, the barrier may be biased toward a portion of the intake passage where the LP-EGR line intersects with the intake passage. In this way, the barrier may not align with the central axis 99.

The first portion may be free of valves, blockages, and other elements that may impede charge air flow. The second portion may comprise a flap (e.g., second valve 9) which may be shaped to adjust a charge air flow rate through the second portion. When the flap is in the solid line illustrated position (herein, referred to as a fully closed position), charge air flow through the second portion is blocked. When the flap is in the small dashed line illustrated position (herein, referred to as a fully open position, charge air may flow uninterruptedly through the second portion. In this way, the second portion is unblocked. The large dashed line position (herein, referred to as a partially open position) illustrates one of a plurality of partially open positions which may include more closed positions (e.g., more closely resembling the fully closed position) and more open positions (e.g., more closely resembling the fully open position).

In some embodiments, additionally or alternatively, the second portion may comprise a mixer, diffuser, baffle, or other flow altering device for promoting mixing between LP-EGR and charge air only within the second portion. The flow altering device may be arranged in the second portion downstream of the LP-EGR passage. In this way, mixing between the LP-EGR and the charge air may only be promoted when desired.

LP-EGR flow may not be adjusted by the flap 9. The LP-EGR line may comprise a LP-EGR valve (e.g., first valve 6) configured to adjust the LP-EGR flow rate through the LP-EGR passage to the second portion. In this way, LP-EGR does not enter the first portion and flows directly to the second portion. Thus, during some conditions where the flap is fully closed, charge air may flow through only the first portion. Furthermore, if the LP-EGR is outside of a fully closed position, such as in a partially open or fully open position, then LP-EGR may flow through the LP-EGR passage and into the second portion. In this way, charge air flows through only the first portion and LP-EGR flows through only the second portion, simultaneously, wherein the charge air and LP-EGR are maintained separated until a termination of the barrier. As illustrated, the barrier may terminate directly upstream of the compressor such that the charge air and LP-EGR may minimally mix upstream of the compressor. By doing this, condensate formation in the intake passage may be mitigated.

The barrier may terminate directly upstream of the compressor. Directly upstream of the compressor may be defined as adjacent and/or proximal to the compressor while being spaced away from a compressor inlet or other most upstream compressor component. By doing this, a space of the intake passage directly upstream of the compressor where the barrier terminates may denote a region where gases from the first portion may mix with gases from the second portion. By minimizing a size of the space directly upstream of the compressor, condensate formation due to mixing between charge air and LP-EGR may be reduced. Furthermore, even if condensate does form, droplets of the condensate formed may be less than the threshold size described above, such that degradation to the compressor may not occur.

In one example, the position of the flap may be adjusted in response to a condensate likelihood. In one example, as the condensate likelihood increases, the flap is adjusted to a more closed position. Additionally or alternatively, if the condensate likelihood exceeds an upper threshold likelihood and/or if an expected condensate amount exceeds a threshold amount, then the flap may be moved to the fully closed position. In this way, LP-EGR may still flow to the engine to decrease $NO_x$ production.

In one embodiment of the method according to the disclosure as shown in FIG. 2, in a first step S1 the internal combustion engine is operated so that charging air is transported through the induction tract 2 and exhaust gas is transported through the exhaust gas recirculation line 5 if the first valve 6 is open. In a second step S2, the load on the internal combustion engine is detected. If the load exceeds a threshold value, the second valve 9 is fully opened (as shown via the short dashed line in FIG. 1), whilst at the same time the first valve 6 is closed so that as much charging air as possible can be passed to the compressor 3 and in this case no exhaust gas is recirculated.

If the load on the internal combustion engine falls below the threshold value or is already below the threshold value, the degree of opening of the second valve 9 is controlled as a function of the temperatures of the exhaust gas and the charging air. For this purpose, the first valve 6 is opened in a third step so that exhaust gas is passed into the induction tract 2.

The exhaust gas temperature is determined in a fourth step S4 via the first temperature sensor 7a. Alternatively, the exhaust gas temperature can also be determined on the basis of a model. In a fifth step S5, the temperature of the charging air is determined via the second temperature sensor 7b. If the temperature of the exhaust gas is below a defined threshold value, which is determined in relation to a dew point related to the temperature of the induction air, the second valve 9 is fully closed in a sixth step S6. In this case, exhaust gas flows in the inner tube 22 and from there flows further into the compressor 3 but is hardly mixed with the induction air upstream of the compressor 3. If the temperature of the exhaust gas is above said threshold value, in step S6 the second valve 9 is opened to a defined extent, so that the exhaust gas and the charging air are mixed, but in this case the dew point of the exhaust gas is not undershot, but the temperature of the exhaust gas-air mixture is also not so high that the material of the compressor 3 is overheated. The degree of opening of the second valve 9 is calculated by the controller 8. Furthermore, the first valve 6 can also be opened to a defined extent in order to control the amount of the exhaust gas that is delivered.

FIG. 3 shows a schematic depiction of a hybrid vehicle system 306 that can derive propulsion power from engine system 308 and/or an on-board energy storage device. An energy conversion device, such as a generator, may be operated to absorb energy from vehicle motion and/or engine operation, and then convert the absorbed energy to an energy form suitable for storage by the energy storage device.

Engine system 308 may include an engine 310 having a plurality of cylinders 330. Engine 310 includes an engine intake 323 and an engine exhaust 325. Engine intake 323 includes an air intake throttle 362 fluidly coupled to the engine intake manifold 344 via an intake passage 342. Air may enter intake passage 342 via air filter 352. Engine exhaust 325 includes an exhaust manifold 348 leading to an exhaust passage 335 that routes exhaust gas to the atmosphere. Engine exhaust 325 may include one or more emission control devices 370 mounted in a close-coupled position or in a far underbody position. The one or more emission control devices may include a three-way catalyst, lean $NO_x$ trap, diesel particulate filter, oxidation catalyst, etc. It will be appreciated that other components may be included in the engine such as a variety of valves and sensors, as further elaborated in herein. In some embodiments, wherein engine system 308 is a boosted engine system, the engine system may further include a boosting device, such as a turbocharger. Compressor 3 may draw air from air intake passage 342 to supply engine 310 with compressed air via a compressor outlet tube (not shown in FIG. 3). In one example, compressor 3 may be a turbocharger, where power to the compressor 3 is drawn from the flow of exhaust gases through turbine 303. Specifically, exhaust gases may spin turbine 303 which is coupled to compressor 3 via shaft 304.

However, in alternate embodiments, the compressor 3 may be a supercharger, where power to the compressor 3 is drawn from the crankshaft. Thus, the compressor 3 may be coupled to the crankshaft via a mechanical linkage such as a belt. As such, a portion of the rotational energy output by the crankshaft, may be transferred to the compressor 3 for powering the compressor 3.

In some embodiments, engine 310 is configured to provide exhaust gas recirculation, or EGR. When included, EGR may be provided as high-pressure EGR and/or low-pressure EGR. In examples where the engine 310 includes low-pressure EGR, the low-pressure EGR may be provided via EGR passage 5 and EGR valve 6 to the engine air intake system at a position downstream of air intake system (AIS) throttle 362 and upstream of compressor 3 from a location in the exhaust system downstream of turbine 303. EGR may be drawn from the exhaust system 325 to the intake air system 323 when there is a pressure differential to drive the flow, which may be generated via throttle 362.

As shown, the EGR passage 5 extends into the inner tube 22 and/or the second portion 22 at a position downstream of the second valve 9 and/or flap 9 such that the flap may not adjust a LP-EGR flow rate. Once downstream of the throttle, intake air (e.g., charge air) flow through the first portion 21 and/or the outer tube 21 may not be adjusted. However, the flap 9 may adjust intake air flow through the second portion 22.

During some conditions, it may be desired to flow LP-EGR and intake air through the second portion 22. As such, the EGR valve 6 may be open and the flap 9 may be open. In this way, intake air and charge air may mix in only the second portion upstream of the compressor 3. Thus, intake air in the first portion does not mix with LP-EGR even when the flap 9 is open. During conditions where it is undesired to mix LP-EGR with intake air, but LP-EGR is still desired, then the flap 9 may be fully closed, so that intake air flows through only the first portion and LP-EGR flows through only the second portion. LP-EGR and intake air may minimally mix directly upstream of the compressor so that condensate formation is reduced relative to other examples which comprise more mixing between LP-EGR and intake air. In this way, degradation to the compressor due to condensate droplets may be avoided.

Vehicle system 306 may further include control system 314. Control system 314 is shown receiving information from a plurality of sensors 316 (various examples of which are described herein) and sending control signals to a plurality of actuators 381 (various examples of which are described herein). As one example, sensors 316 may include exhaust gas sensor 326 located upstream of the emission control device, temperature sensor 328, and pressure sensor 329. Other sensors such as additional pressure, temperature, air/fuel ratio, and composition sensors may be coupled to various locations in the vehicle system 306. As another example, the actuators may include the throttle 362.

Controller 312 may be configured as a conventional microcomputer including a microprocessor unit, input/output ports, read-only memory, random access memory, keep alive memory, a controller area network (CAN) bus, etc. Controller 312 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 306 comprises multiple sources of torque available to one or more vehicle wheels 359. In other examples, vehicle 306 is a conventional vehicle with only an engine, or an electric vehicle with only electric machine(s). In the example shown, vehicle 306 includes engine 310 and an electric machine 351. Electric machine 351 may be a motor or a motor/generator. A crankshaft of engine 310 and electric machine 351 may be connected via a transmission 354 to vehicle wheels 359 when one or more clutches 356 are engaged. In the depicted example, a first clutch 356 is provided between a crankshaft and the electric machine 351, and a second clutch 356 is provided between electric machine 351 and transmission 354. Controller 312 may send a signal to an actuator of each clutch 356 to engage or disengage the clutch, so as to connect or disconnect crankshaft from electric machine 351 and the components connected thereto, and/or connect or disconnect electric machine 351 from transmission 354 and the components connected thereto. Transmission 354 may be a gearbox, a planetary gear system, or another type of transmission. The powertrain may be configured in various manners including as a parallel, a series, or a series-parallel hybrid vehicle.

Electric machine 351 receives electrical power from a traction battery 361 to provide torque to vehicle wheels 359. Electric machine 351 may also be operated as a generator to provide electrical power to charge battery 361, for example during a braking operation.

Turning now to FIG. 4, it shows a method 400 for adjusting positions of the EGR valve and the flap based on at least a LP-EGR temperature. Instructions for carrying out method 400 and the method 200 included above may be executed by a controller based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below.

The method 400 begins at 402, which includes determining, estimating, and/or measuring current engine operating parameters. Current engine operating parameters may include one or more of a throttle position, a manifold vacuum, a LP-EGR flow rate, a boost pressure, an ambient temperature, an engine speed, an engine temperature, and an air/fuel ratio.

The method 400 proceeds to 404, which includes determining if an engine load is greater than or equal to a threshold load. The threshold load may be based on a relatively high engine load, where a full amount of intake air is desired. That is to say, the threshold load may correspond to an engine load at wide-open throttle, where a largest amount of intake air possible is desired. If the engine load is greater than or equal to the threshold load, then the method 400 proceeds to 406, which includes adjusting the flap (e.g., the second valve 9 of FIG. 1) to the fully open position. By doing this, charge air may flow unabated through the first portion and the second portion of the intake passage.

The method 400 proceeds to 408, which includes adjusting the EGR valve to the fully closed position to block LP-EGR from flowing to the second portion. As such, the engine receives a maximum amount of charge air.

Returning to 404, if the engine load is less than the threshold load, then the method 400 proceeds to 410 to determine a LP-EGR temperature. In one example, the LP-EGR temperature may be sensed via a temperature sensor, such as temperature sensor 7a of FIG. 1. Additionally or alternatively, the LP-EGR temperature may be estimated based on data stored in a multi-input look-up table, wherein the inputs may include engine speed, engine temperature, ambient temperature, air/fuel ratio, and the like. In one example, if the engine load is less than the threshold load, then LP-EGR may be desired and the EGR valve may be adjusted to a more open or fully open position.

The method 400 proceeds to 412, which may include determining a charge air temperature. In one example, the charge air temperature may be sensed via a temperature sensor, such as temperature sensor 7b of FIG. 1. Additionally or alternatively, the charge-air temperature may be based on data stored in a multi-input look-up table, wherein the inputs may include engine speed, engine temperature, ambient temperature, and the like.

The method 400 proceeds to 414, which includes determining if the LP-EGR temperature is less than a lower threshold temperature. The lower threshold temperature may be based on a temperature equal to or slightly greater than a dew point temperature. Additionally or alternatively, the lower threshold temperature may be based on a temperature that when the LP-EGR is mixed with charge air, the temperature of the mixture may drop below the dew point temperature and water in the mixture, contributed via either the charge air or the LP-EGR, may begin to condense. As such, if the LP-EGR temperature is less than the lower threshold temperature, then a likelihood of condensate formation is relatively high and the method 400 proceeds to 416, which includes adjusting the flap to the fully closed position.

The method 400 proceeds to 418, which includes not mixing LP-EGR and charge air in the second portion. As such, charge air flow through the first portion and LP-EGR flows through the second portion to the compressor, wherein the charge air and the LP-EGR slightly mix directly upstream of the compressor. In this way, the LP-EGR temperature may not fall below the dew point temperature. Additionally or alternatively, the LP-EGR temperature may decrease to a temperature less than the dew point temperature, but the temperature may be higher than it would be if the first portion and the second portion were not divided and charge air allowed to mix with the LP-EGR. As such, condensate formation in the intake passage may be reduced and a size of droplets formed in the intake passage may be reduced.

Returning to 414, if the LP-EGR temperature is not less than the lower threshold temperature, then the method 400 proceeds to 420, which includes determining if the LP-EGR temperature is greater than an upper threshold temperature. The upper threshold temperature may be based on a temperature where mixing the LP-EGR with charge air when the flap is in the fully open position may not result in the LP-EGR temperature falling below the lower threshold temperature. That is to say, the likelihood of condensate formation when the LP-EGR temperature is greater than the upper threshold temperature If the LP-EGR temperature is greater than the upper threshold, then the method 400 proceeds to 422, which includes adjusting the flap to the fully open position followed by mixing LP-EGR and charge air in the second portion at 424. By doing this, a highest amount of charge air may flow through the second portion and mix with LP-EGR farther upstream of the compressor than when the flap is in the fully closed position.

If the LP-EGR temperature is not greater than the upper threshold temperature, then the LP-EGR temperature is between the lower threshold temperature and the upper threshold temperature. As such, the method 400 proceeds to 426 to adjust the flap to a partially open position. A magnitude of opening of the flap may be based on a difference between the LP-EGR temperature and the lower threshold temperature, wherein as the temperature increases, the magnitude of the opening increases. That is to say, as the LP-EGR temperature further increases such that the difference between the LP-EGR temperature and the lower threshold temperature increases, the magnitude of the opening of the flap may increase to allow more charge air to mix with the LP-EGR in the second portion. In this way, a mixing amount at 424 following 426 between LP-EGR and charge in the second portion may be adjusted in response to the LP-EGR temperature.

In some examples of the method 400, the lower threshold temperature and the upper threshold temperature may be adjusted based on ambient temperature and/or the charge air temperature. For example, if the charge air temperature and/or ambient temperature increase, then the lower and upper threshold temperatures may also increase. As another example, if the charge air temperature and/or ambient temperature decrease, then the lower and upper threshold temperatures may also decrease. As such, the lower and upper threshold temperatures may be directly related to the charge air temperature and/or ambient temperature.

In this way, LP-EGR mixing with charge air may be adjusted based on LP-EGR and charge air temperatures to mitigated condensate formation. The technical effect of delaying LP-EGR mixing with charge air is to decrease condensate formation, which may increase a compressor longevity.

An embodiment of a system comprises an intake passage comprising a barrier configured to fluidly separate a first portion from a second portion, a LP-EGR passage configured to flow EGR to only the second portion, and a flap arranged in the second portion upstream of an outlet of the LP-EGR.

A first example of the system further includes where the second portion is larger than the first portion.

A second example of the system, optionally including the first example, further includes where the barrier is upstream of a compressor relative to a direction of intake air flow.

A third example of the system, optionally including one or more of the previous examples, further includes where the first portion and the second portion merge directly upstream of a compressor.

A fourth example of the system, optionally including one or more of the previous examples, further includes where a controller comprises computer-readable instructions stored on non-transitory memory that when executed enable the controller to actuate the flap to a fully open position to flow charge air through the second portion.

A fifth example of the system, optionally including one or more of the previous examples, further includes where the instructions further enable the controller to actuate an EGR valve to an open position to flow LP-EGR to the second portion.

An embodiment of a method comprises flowing charge air through only a first portion of an intake passage and LP-EGR through only a second portion of the intake passage when a LP-EGR temperature is less than a lower threshold temperature.

A first example of the method further comprises where the first portion is hermetically sealed from the second portion via a barrier arranged downstream of a throttle and upstream of a compressor.

A second example of the method, optionally including the first example, further includes adjusting a flap configured to adjust charge air flow through the second portion, wherein adjusting the flap comprises adjusting the flap from a fully closed position to a fully open position in response to an engine load being greater than or equal to a threshold load or to the LP-EGR temperature being greater than an upper threshold temperature.

A third example of the method, optionally including one or more of the previous examples, further includes actuating an EGR valve to a fully closed position in response to the engine load being greater than or equal to the threshold load.

A fourth example of the method, optionally including one or more of the previous examples, further includes flowing LP-EGR and charge air through the second portion in response to the LP-EGR temperature being greater than the upper threshold temperature.

A fifth example of the method, optionally including one or more of the previous examples, further includes adjusting the flap to a partially open position between the fully closed position and the fully open position in response to the LP-EGR temperature being between the lower threshold temperature and the upper threshold temperature.

A sixth example of the method, optionally including one or more of the previous examples, further includes determining a magnitude of an opening of the partially open position is based on one or more of the LP-EGR temperature, a charge-air temperature, an ambient temperature, and humidity.

An exhaust-gas recirculation arrangement comprises an intake passage comprising a barrier downstream of a throttle, wherein the barrier is biased relative to a central axis of the intake passage, wherein the barrier separates a first portion from a second portion, a low-pressure exhaust gas recirculation passage fluidly coupled to only the second portion, wherein the low-pressure exhaust gas recirculation passage comprises an exhaust gas recirculation valve, a flap arranged upstream of the low-pressure exhaust gas recirculation passage in the second portion relative to a direction of charge air flow, a compressor arranged directly downstream of the barrier, and a controller with computer-readable instructions stored on non-transitory memory thereof that when executed enable the controller to adjust the exhaust gas recirculation valve to a fully closed position and the flap to a fully open position in response to an engine load being greater than a threshold load, adjust the exhaust gas recirculation valve to an open position and the flap to a fully closed position in response to the engine load not being greater than the threshold load and a low-pressure exhaust gas temperature being less than a lower threshold temperature, adjust the exhaust gas recirculation valve to an open position and the flap to a fully open position in response to the engine load not being greater than the threshold load and the low-pressure exhaust gas temperature being greater than an upper threshold temperature, and adjust the exhaust gas recirculation valve to an open position and the flap to a partially open position in response to the engine load not being greater than the threshold load and the low-pressure exhaust gas temperature being between the lower and upper threshold temperatures.

A first example of the exhaust-gas recirculation arrangement further includes where a magnitude of an opening of the partially open position is based on one or more of the LP-EGR temperature and the charge air temperature.

A second example of the exhaust-gas recirculation arrangement, optionally including the first example, further includes where the magnitude increases as the LP-EGR temperature increases.

A third example of the exhaust-gas recirculation arrangement, optionally including one or more of the previous examples, further includes where the magnitude increases as the charge-air temperature increases.

A fourth example of the exhaust-gas recirculation arrangement, optionally including one or more of the previous examples, further includes where charge air in the first portion does not mix with charge air and low-pressure exhaust gas recirculate in the second portion.

A fifth example of the exhaust-gas recirculation arrangement, optionally including one or more of the previous examples, further includes where the barrier is one or more of a wall or a pipe, wherein a volume of the second portion is greater than a volume of the first portion.

A sixth example of the exhaust-gas recirculation arrangement, optionally including one or more of the previous examples, further includes where the first portion and the second portion are free of mixing devices.

In another representation, an arrangement of an internal combustion engine with an induction tract, an exhaust system and with a low pressure exhaust gas recirculation line branching off from the exhaust system, leading to the induction tract, comprising a first valve, wherein in a defined region upstream of a compressor that is disposed in the induction tract the induction tract is divided lengthwise into an outer tube and an inner tube by a dividing wall, wherein a second valve is disposed in the inner tube and the exhaust gas recirculation line opens into the inner tube downstream of the second valve.

A first example of the arrangement further comprises where a part of the wall of the inner tube is formed by the wall of the induction tract.

A second example of the arrangement, optionally including the first example, further comprises where the downstream end of the inner tube is disposed directly adjacent to the compressor.

A third example of the arrangement, optionally including one or more of the previous examples, further comprises where different degrees of opening of the second valve are adjusted.

A fourth example of the arrangement, optionally including one or more of the previous examples, further comprises where the second valve is embodied as a flap valve.

A third example of the arrangement, optionally including one or more of the previous examples, further comprises where a controller that is connected to the first valve and the second valve is embodied to control the openings of the valves as a function of parameters selected from the group containing the exhaust gas temperature in the exhaust gas recirculation line, the temperature of the induction air and the load on the internal combustion engine.

A method for controlling the amount of recirculated exhaust gas of the arrangement comprises operating the internal combustion engine, detecting the load on the internal combustion engine, detecting the exhaust gas temperature in the exhaust gas recirculation line, detecting the temperature of the induction air, adjusting the first valve in the exhaust gas recirculation line, and adjusting the second valve in the inner tube.

The method further comprises where the second valve is fully closed and the first valve is opened if the exhaust gas temperature lies below a defined threshold value.

The method further comprises where the second valve is opened to 100% and the first valve is closed if the load on the internal combustion engine exceeds a defined threshold value.

The method further comprises where the second valve is partially opened so that the degree of opening lies between 0 and 100%, and the first valve is opened if the exhaust gas temperature lies above a defined threshold value and the load on the internal combustion engine lies below a defined threshold value.

The method further comprises where the degree of opening of the second valve (9) is controlled as a function of the temperature of the induction air.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   adjusting a flap to a fully closed position to flow charge air through only a first portion of an intake passage and LP-EGR through only a second portion of the intake passage when a LP-EGR temperature is less than a lower threshold temperature; and
   adjusting the flap from the fully closed position to a fully open position to flow the charge air through the second portion in response to an engine load being greater than or equal to a threshold load or to the LP-EGR temperature being greater than an upper threshold temperature.

2. The method of claim 1, wherein the first portion is fluidly separated from the second portion via a barrier arranged downstream of a throttle and upstream of a compressor.

3. The method of claim 2, further comprising actuating an EGR valve to the fully closed position in response to the engine load being greater than or equal to the threshold load.

4. The method of claim 2, further comprising flowing the LP-EGR and the charge air through the second portion in response to the LP-EGR temperature being greater than the upper threshold temperature.

5. The method of claim 2, further comprising adjusting the flap to a partially open position between the fully closed position and the fully open position in response to the LP-EGR temperature being between the lower threshold temperature and the upper threshold temperature.

6. The method of claim 5, wherein determining a magnitude of an opening of the partially open position is based on one or more of the LP-EGR temperature, a charge-air temperature, an ambient temperature, and humidity.

* * * * *